Nov. 30, 1965  H. S. SWANSON ETAL  3,220,570
ASSEMBLY AND WRAPPING OF GROUPS OF ARTICLES
Filed Feb. 4, 1964  6 Sheets-Sheet 4

INVENTORS
HARRY S. SWANSON
WILLIAM HOPPE
BY Chapin & Neal
Attorneys

United States Patent Office 3,220,570
Patented Nov. 30, 1965

3,220,570
ASSEMBLY AND WRAPPING OF GROUPS OF ARTICLES
Harry S. Swanson, East Longmeadow, and William Hoppe, Longmeadow, Mass., assignors to Package Machinery Company, East Longmeadow, Mass., a corporation of Massachusetts
Filed Feb. 4, 1964, Ser. No. 343,191
11 Claims. (Cl. 214—6)

The present invention relates to improvements in the assembly of groups of articles in stacked relation particularly in combination with a wrapping machine which wraps the articles as a composite unit in what is commonly referred to as a bundling operation. This application is a continuation-in-part of co-pending application Serial No. 270,872, filed April 5, 1963, now abandoned.

One object of the invention is to provide improved means for stacking two or more layers of articles at high rates of operation and with a high degree of reliability, particularly where each layer comprises a plurality of articles.

Another object of the invention is to simplify the means and methods of wrapping groups of articles in a bundling operation, having particular regard to the manner of stacking the articles to be wrapped.

A further object of the invention is to attain the above ends in a versatile manner permitting a choice of the orientation of the articles relative to the instrumentalities which are to fold a wrapper about the stacked group.

One aspect of the invention comprises a stacking device wherein means are provided for advancing a line of abutting articles. An elevator lifts successive articles from this line to latch means on which the articles are stacked. When a stack of articles has the desired number of layers, dependent upon the number of reciprocations of the elevator, the assembled stack is then discharged from the latch means.

In another aspect, the invention comprises in combination with an elevator type wrapping machine, an assembly elevator for lifting an article from a line of articles which are advanced thereto in abutting relation. Latch means receive the article lifted by the assembly elevator and means are then provided for transferring the lifted article and another article from the line of articles to the elevator of the wrapping machine in stacked relation, whereupon the articles may be automatically wrapped by the mechanism of the wrapping machine.

Another aspect of the invention contemplates that a line of abutting articles will be fed toward a vertically reciprocating elevator in a wrapping machine. An auxiliary elevator is disposed immediately in advance of this elevator and raises one or more articles to latch means above said line of articles, preferably while the wrapping machine elevator is in a raised position. When the latter elevator is lowered, an article is advanced thereon from the line of articles. The article or articles on the latch means are advanced onto the article on the wrapping machine elevator which is raised to advance the stack of articles to the wrapping instrumentalities.

The above and other related objects and features of the invention will be apparent from a reading of the following description of the disclosure found in the accompanying drawings and the novelty thereof pointed out in the appended claims.

Figure 1:
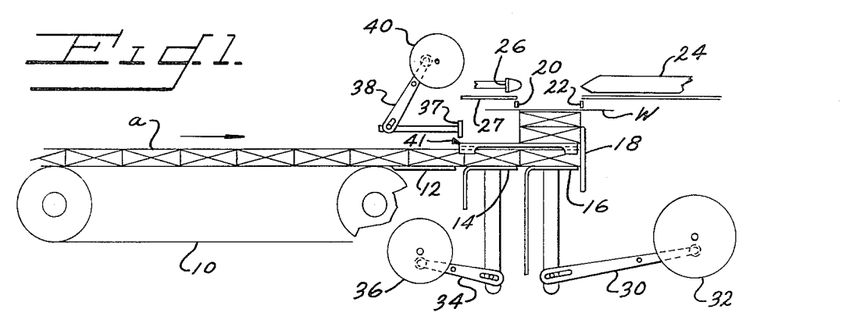
FIG. 1 is a diagrammatic view of a wrapping machine embodying the present invention.

The present invention is intended for use in an elevator type wrapping environment as seen in FIG. 1. However, use with other types of wrapping is also contemplated in the broader aspects of the invention. A typical elevator type machine is depicted diagrammatically in FIG. 1 since these machines and the mechanical details of their construction are well known in the art.

Articles $a$ are fed manually or otherwise to a constantly operating belt conveyor 10 and form an abutting line which passes over a plate 12, an auxiliary elevator 14, a main elevator 16 and eventually engages a wall 18 of the elevator well. It will be later explained how a plurality of articles are advanced to the main elevator, but to continue the machine description, the elevator 16 is raised and the articles thereon engage a wrapper $w$ positioned thereabove. Opposed portions 20, 22 of the elevator well drape the wrapper about the articles as they are raised to the level of a folding channel 24. A pusher 26 advances the articles into the folding channel after or as the rear wrapper end has been folded beneath the articles by a movable plate 27. Tuckers on the pusher 26 and means along the folding channel cooperate to fold the wrapper extensions against the ends of the articles as they are advanced through the folding channel by means not shown. During this time the elevator is lowered for a subsequent operation.

The main elevator 16 is guided for vertical movement and operated through a pivoted lever 30 which is oscillated by a cam 32. The auxiliary elevator 14 is likewise guided for reciprocable movement and operated by a pivoted lever 34 which is oscillated by a cam 36. A pusher 37 is appropriately guided for horizontal movement above the auxiliary elevator 14 and is operated by a pivoted lever 38 which is oscillated by a cam 40.

Briefly speaking, the articles are stacked for wrapping in the following manner. One or more articles are raised by the auxiliary elevator 14 to latches 41 thereabove. The article or articles on the latches is advanced above the main elevator 16 by pusher 37. After an article has been advanced from the line of articles onto the main elevator (in its lowest position) it is raised to lift the articles from the latches and with the articles thus stacked thereon the wrapping operation continues in a conventional manner as described.

Figures 2, 3:
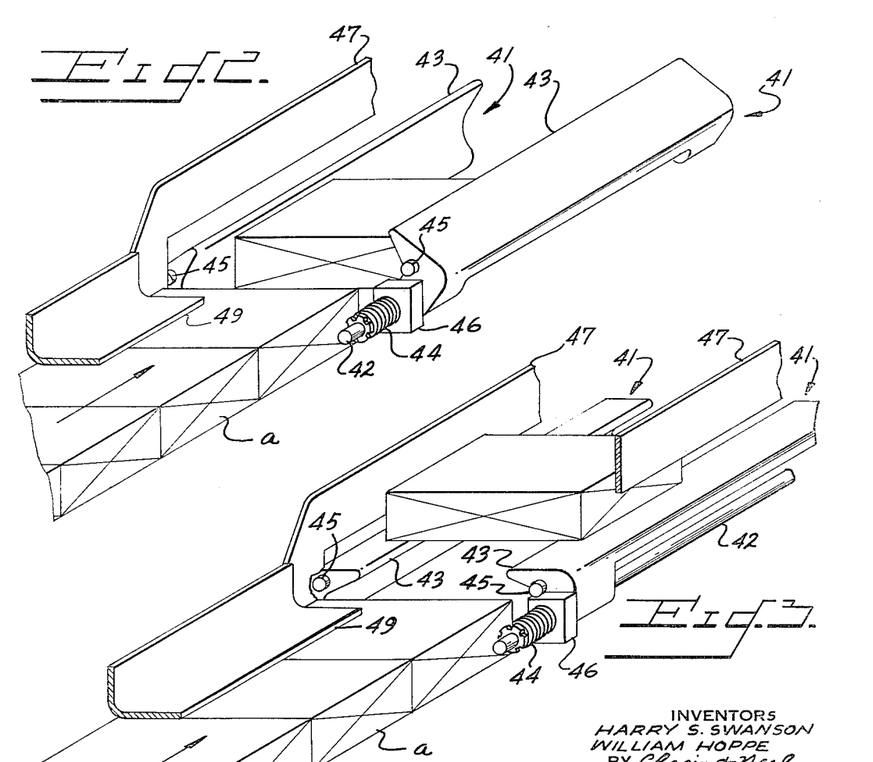
FIGS. 2 and 3 show in greater detail latch means employed in the operation of the present device.
Figure 4:
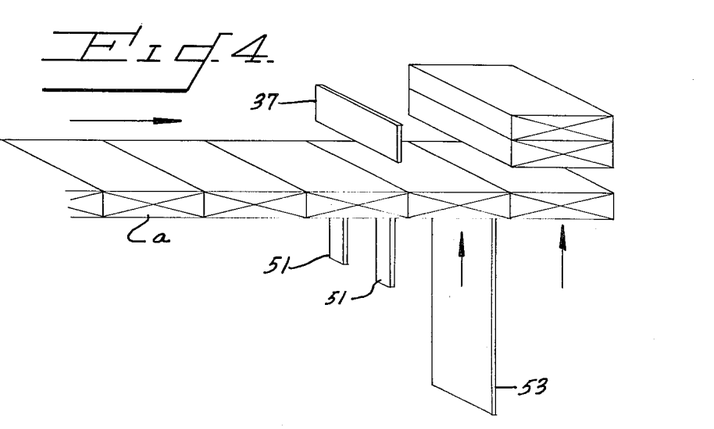
FIGS. 4–9 illustrate the sequence of operation of this device.

Referring now to FIGS. 2 and 3, the latches are shown in greater detail as being pivotally mounted on rods 42. The latches comprise rail-like portions 43 which are normally held in horizontal position by springs 44 urging pins 45 (projecting from the latches) into engagement with stops 46 which also serve to mount the rods 42. As an article is raised by the auxiliary elevator 14, the latches 41 are swung outwardly by the article until the bottom thereof is raised above said latches.

The latches then swing back to their normal horizontal positions by springs 44 and the elevator 14 is lowered to deposit the article thereon. Subsequent reciprocations of the elevator 14 will build up a stack of articles until this stack is advanced by the pusher 37 to the main elevator 16.

There are several preferred features to be noted. Side guides 47 are provided above the latches to laterally position the articles thereon in a positive manner. A holddown plate 49 may be provided above the line of articles extending to the auxiliary elevator 14 so that an adjacent article won't be displaced as an article is raised by said auxiliary elevator. Further, the rail-like portions 43 of the latches and the side guides 47 continue to the rear of the elevator well so that articles will be positively positioned for transfer to the main elevator 16. The widths of the elevators 14 and 16 are preferably less than the normal spacing between the rail-like portions 43 of the latches so that they may pass freely therebetween.

The sequence of operation will be better understood with reference to FIGS. 4–9. Arbitrarily assuming that a cycle commences with the relationships shown in FIG. 1, the line of abutting articles has been advanced over both of the elevators 14 and 16 against the wall 18. Two stacked articles are positioned, during the previous cycle, above the main elevator 16 on the latches 41. At approximately the same time, the elevators 14 and 16 are moved upwardly, preferably the main elevator is raised slightly in advance of the auxiliary elevator.

Figure 5:
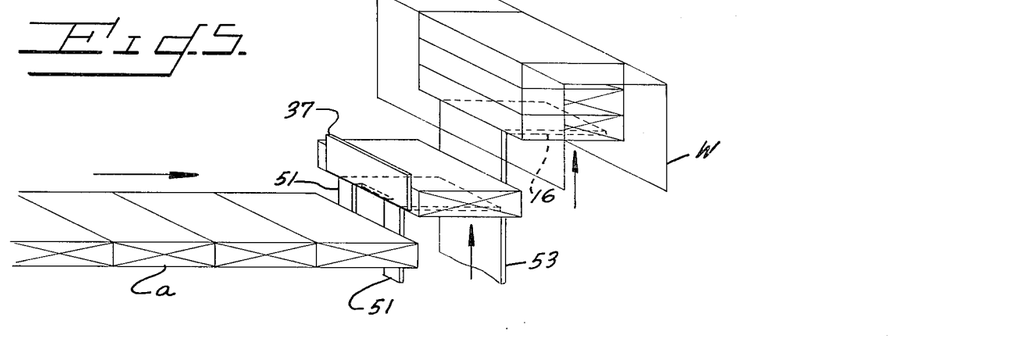
Figure 6:
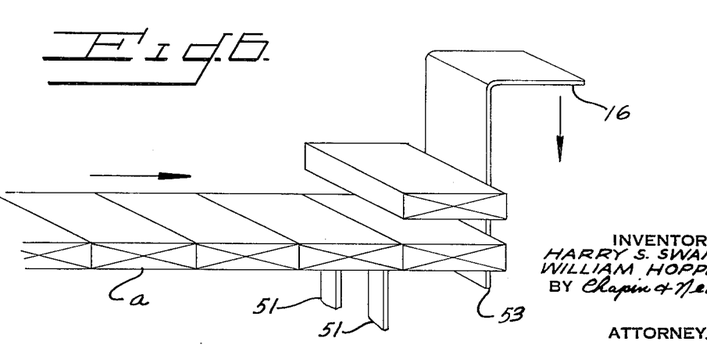
Figure 7:
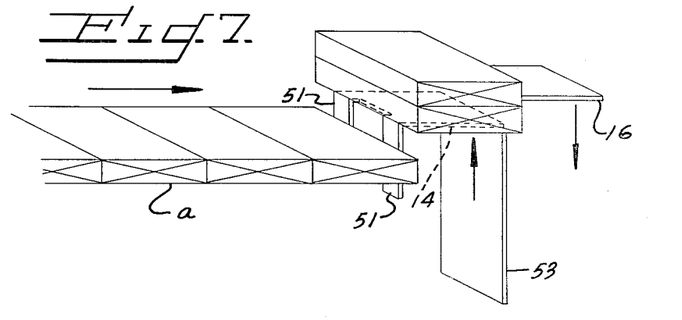
Figure 8:
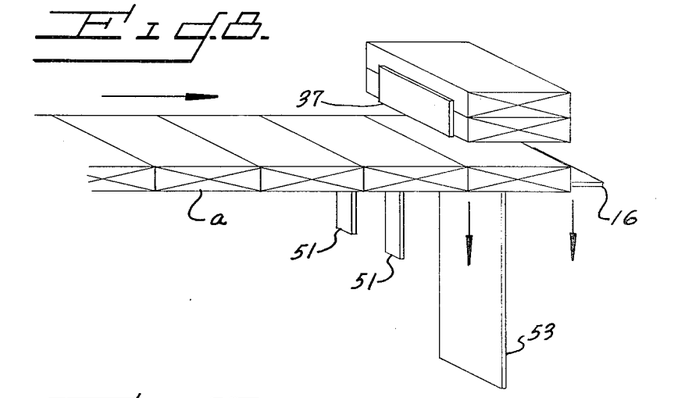
Figure 9:
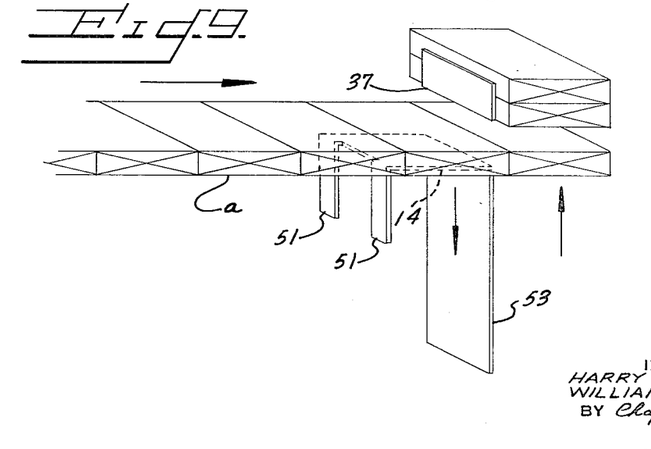

As upward movement of the elevators continues to the point seen in FIG. 5, the auxiliary elevator 14 deposits an article on the latches 41, the pusher 37 now being in a retracted position. The main elevator 16 continues its upward movement through the elevator well to drape the wrapper w over the stack of three articles. At this point it will be noted that advance of the abutting line of articles is now controlled or halted by skirts 51 depending from the infeed side of the auxiliary elevator 14. A skirt 53 also depends from the infeed side of the main elevator 16 to prevent articles from becoming jammed therebeneath.

While the main elevator 16 is in a raised position, the auxiliary elevator 14 is lowered (FIG. 6) to receive another article advanced from the conveyor 10. The auxiliary elevator 14 is then raised again (FIG. 7) to lift a second article onto the latches 41 and thus position a stack of two articles in advance of the pusher 37. Both of the elevators 14 and 16 are now lowered (FIG. 8) and articles are advanced thereover by the conveyor 10. At approximately the same time, the pusher 37 is actuated to advance the stack of two articles along the latches 41 toward the elevator well. The advance of articles continues (FIG. 9) until one article is positioned on each of the elevators 14 and 16 and the stack of two articles is positioned on the latches 41 immediately above the main elevator 16. The pusher 37 is then retracted and the relationships of FIG. 4 are again established for a subsequent cycle of operation.

It will be apparent that the number of articles which are in the stack to be wrapped is dependent on the number of reciprocations of the auxiliary elevator 14, for each cycle of operation of the main elevator 16.

Thus one or more articles may be transferred from the latches 41 to the main elevator with four or five probably being the greatest practical number.

Reverting back to FIG. 5, when the main elevator 16 reaches its highest position the articles thereon with the wrapper w draped thereover are advanced into the folding channel 24 by the pusher 26. The stack of articles is thus wrapped with the extensions of the wrapper w being folded against the opposite end faces of the articles. This orientation of the wrapper folds results from the fact that the conveyor 10, auxiliary elevator 14, and the main elevator 16, are aligned with each other and also parallel to the folding channel 24.

Figure 12:
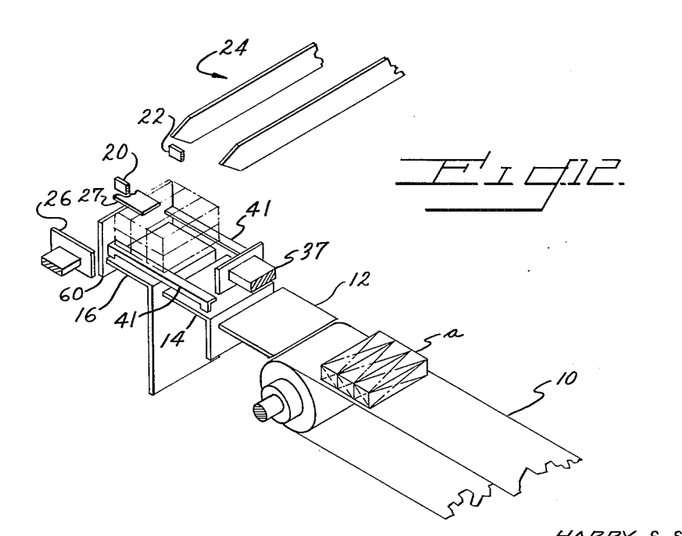
FIG. 12 is a perspective view diagrammatically illustrating an embodiment of the invention employed in obtaining the wrapper orientation of FIG. 11.

FIG. 12 illustrates an alternate embodiment of the invention for obtaining a different orientation of the wrapper folds relative to the stack of articles. The functional elements of FIG. 12 will find equivalent parts in the previous embodient of the invention and are identified by like reference characters. Thus it will be seen that articles are advanced in abutting relation by infeed conveyor 10, across a dead plate 12, to the auxiliary elevator 14, and the main elevator 16; all of these components being in aligned relation. The distinction to be noted, however, is that these components are in transverse relation to the folding channel 24.

The operation of this embodiment of the invention is essentially the same as that previously described. Thus, one or more articles or layers of articles are raised by the auxiliary elevator 14 to the latches 41 thereabove. The article or articles on the latches is advanced above the main elevator 16 by pusher 37. After an article has been advanced from a line of articles onto the main elevator 16 (in its lowest position) it is raised to lift the article or articles from the latches 41 and with the articles thus stacked in at least two layers thereon, a wrapper w is draped over the stack by the forming well portions 20, 22. It will be noted that stop plate 60 is provided to position articles advanced onto the auxiliary elevator 16 and also to positively control advance of articles along the latches 41 by the pusher 37.

When the stack of articles is elevated to a position in alignment with the folding channel 24, pusher 26 advances the stack of articles into the folding channel through which they are advanced by conventional means.

The result is that the wrapper extensions are now folded against faces of the articles defining opposite sides of the stack, which faces were originally the leading and trailing faces of the articles as they were advanced to the wrapping machine. This relationship is due to the fact that the aligned components 10, 14 and 16 are disposed transversely of the folding channel 24.

From the above it will be apparent that what has heretofore been referred to as single articles, may be compositely formed as a layer of articles in side-by-side relation. It will further be apparent that when each layer of a stack comprises a plurality of articles, for practical purposes, the articles must be advanced lengthwise of the latches 41 as they are assembled in stacked relation.

The orientation of the folded wrapper extensions is of particular significance in many instances, since most products, which the articles a represent, are designed with a given pair of opposed surfaces which would preferably be disposed behind the folded wrapper portions so that the remaining surfaces could be best displayed through a single thickness of wrapper material. The embodiments described provide the ability to obtain the orientation of the wrapper folds for best display of the product.

Figure 13:
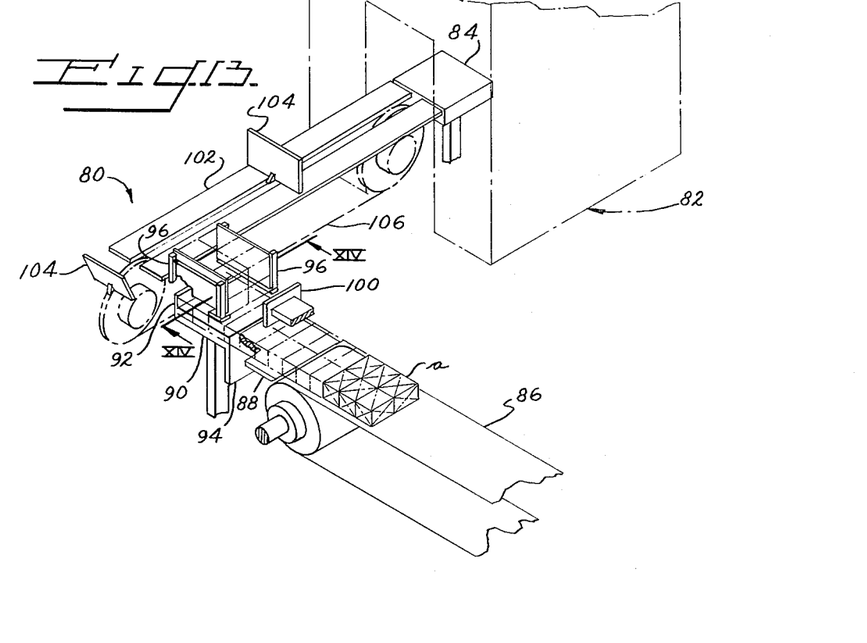
FIG. 13 is a perspective view diagrammatically illustrating a modified embodiment of the invention.

The alternate embodiment seen in FIG. 13 permits use of the invention with a minimum of modification in the design of existing machines. Thus conveyor 80 is of a type normally employed in feeding articles to a wrapping machine 82 which is illustratively shown as comprising an elevator 84 which receives articles from the conveyor 80 to raise them to a folding channel, as in the previous embodiments.

Articles are manually placed on or otherwise advanced to a belt conveyor 86 which frictionally advances a line of abutting articles across a dead plate 88 to an elevator 90. The elevator 90 has a raised lip 92 for positioning thereon the leading article or articles of the line of articles advanced by the conveyor 86 and a depending flange 94 for restraining advance of the line of articles when the elevator is in a raised position.

Latches 96 (see also FIG. 14) are provided above the elevator 90 and preferably with their supporting surfaces 97 at the level of the conveyor 80. The latches 96 are pivotally mounted on rods 99 with springs 101 urging the latches to their illustrated article supporting positions. When the elevator 90 is raised, the latches 96 will be cammed outwardly by the article or articles thereon until the lower surface of the elevated articles is at the level of the supporting surfaces 97, whereupon springs 101 will return the latches to their supporting positions as the elevator 90 is lowered.

In the present embodiment it is contemplated that the articles a on the conveyor 86 will be two across in end-to-end relation, that is, there are two rows of articles on the conveyor 86. Further, the depth of the elevator 90 is such that three pairs of articles in end-to-end relation will be positioned thereon in side-by-side relation by the lip 92.

With six articles thus positioned thereon, the elevator 90 is raised to the level of the latches 96 to deposit this layer of articles on the latches. The elevator is then lowered to receive a subsequent layer of articles from the conveyor 86. Continued reciprocation of the elevator 90 thus assembles a stack of articles on the latches 96 to a desired height.

The pairs of articles in end-to-end relation are maintained on the latches 96 by plates 98 which are spaced apart a distance closely approximating the combined length of each pair of articles. Thus, with relatively rigid articles, and/or relatively high articles, the plates 98 prevent the pairs of articles from tipping inwardly and falling from the latches 96 when the elevator 90 is lowered to receive a subsequent layer of articles from the conveyor 86.

Figure 14:
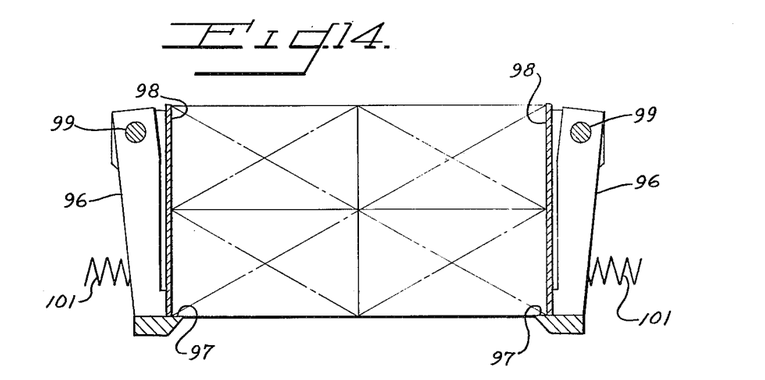
FIG. 14 is a section, on an enlarged scale, taken on line XIV—XIV in FIG. 13.

The depending form of latch 96 is preferred for supporting pairs of articles in end-to-end relation, since the surfaces 97 move in flat arcs permitting the lower edges of the plates 98 to extend to the surfaces 97 where they are most effective in preventing pairs of articles from tipping inwardly.

Periodically, after a given number of reciprocations of the elevator 90, a pusher 100 discharges the stack of articles assembled on latches 96 to the conveyor 80. The conveyor 80 preferably comprises a longitudinally split platform 102 and spaced flights 104 on a continuously moving endless chain 106. The pusher 100 discharges a stack of articles onto the platform 102 in advance of each of the flights 104. The timed relationship of the advance of the flights 104 is such that each flight carries a stack of articles to the wrapping machine 82. In the embodiment illustrated, successive stacks would be positioned on the elevator 84 each time it is reciprocated to its lower position. The stacks would then be wrapped by conventional means.

Figure 15:
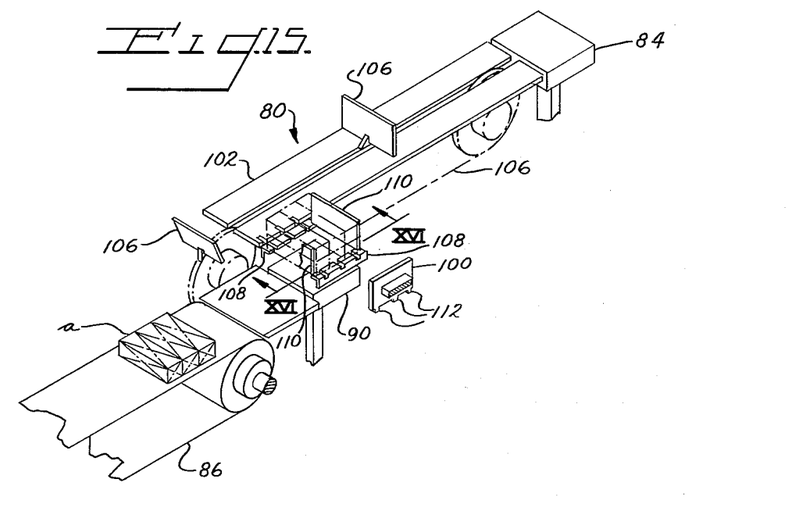
FIG. 15 is a perspective view diagrammatically illustrating an alternate modified embodiment of the invention.
Figure 16:
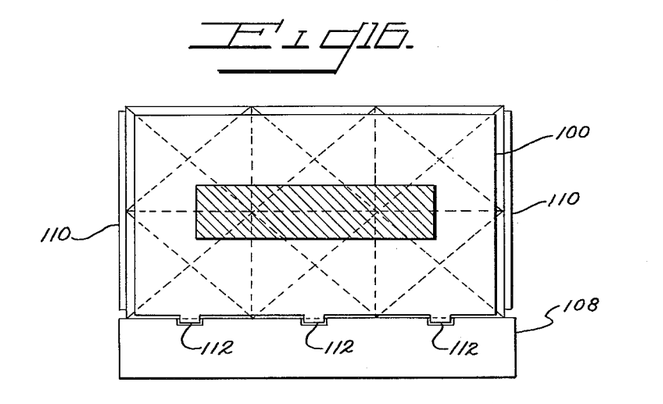
FIG. 16 is a section on an enlarged scale and with portions broken away, taken on line XVI—XVI in FIG. 15.

In FIG. 15 the functional parts are the same as in FIG. 13, however, their relative orientation is different. Thus it will be seen that the conveyor 86 is now aligned with the conveyor 80 and the articles are arranged in a single row on the conveyor 86. The depth of the elevator 90 is such that it receives three articles from the conveyor 86 in its lower position. The latches 108 are preferably aligned with the conveyor 86 and receives successive layers of articles as the elevator 90 is reciprocated to assemble a stack of articles thereon.

Again the pusher 100 is periodically advanced after a given number of reciprocations to dispose a stack of articles for advance by each of the conveyor flights 106. It is not absolutely necessary to support the trailing ends of articles as they are advanced past the latches 108 since, in most instances, the rate of acceleration is sufficient to prevent the stack from falling down to the elevator 90. The side plates 110 may be employed to provide a lateral pressure which further facilitates maintaining the stack in assembled relation as it is advanced across the latches 96 by the pusher 100.

A more positive means for maintaining this assembled relation is provided by lips 112 extending from the pusher 100 to support the lower surface of each article on the bottom layer of the stack. Aligned slots in the latches 108 and platform 102 provide clearance for these lips as the pusher 100 is advanced to deliver the stacks of articles to the conveyor 80.

Figure 10:
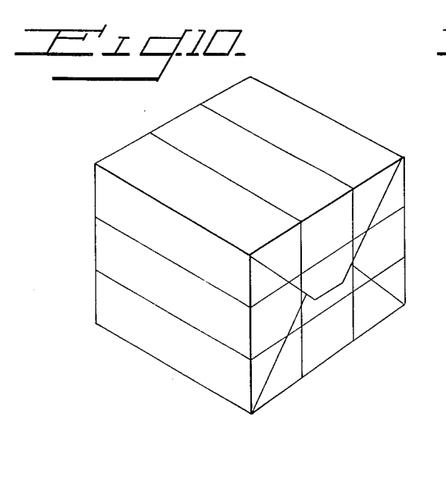
FIG. 10 shows a wrapped stack of articles.
Figure 11:
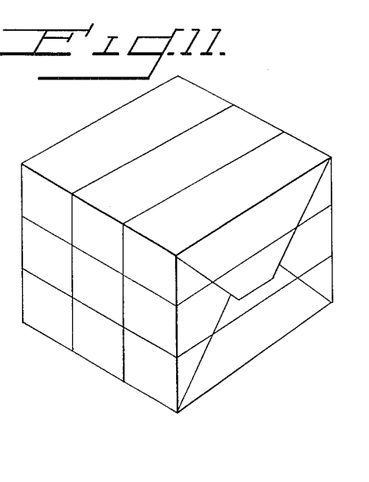
FIG. 11 shows a wrapped stack of articles with the wrapper disposed in an alternate orientation.

The embodiments of FIGS. 13 and 15 illustrate the versatility of the present invention in that the same or essentially the same working parts may be employed to dispose the stack of articles so that the wrapper extensions may be folded against either the end faces or the side faces of the individual articles comprising the stack. Such relationship is dependent upon the orientation of the stack as it is advanced through the folding channel of the wrapping machine as previously explained. Again this relation of the wrapper folds is illustrated by FIGS. 10 and 11, which respectively illustrate what is obtained from the embodiments of FIGS. 15 and 13.

In the embodiments of FIGS. 13 and 15, it will be apparent that many different mechanisms including what is now available to the trade, could be employed to provide the described movement of parts for assembling articles in stacked relation without the need of any specific description.

It will also be apparent that the present invention is capable of many different embodiments to assemble articles in stacked relation and in particular in stacked relation on the elevtator of that type of wrapping machine where articles are raised during the wrapping operation. Further, of course, articles may be stacked in a plurality of layers with each layer comprising one or more articles. The scope of the invention is, therefore, to be measured solely from the appended claims.

Having thus described the invention, what is claimed as novel and desired to be secured by Letters Patent of the United States is:

1. In a wrapping machine, a main elevator, an auxiliary elevator adjacent thereto, means for feeding articles onto said elevators, latch means disposed above said auxiliary elevator, means for reciprocating said elevators in such timed relation that an article is transferred to the latch means by the auxiliary elevator as the main elevator is operating, and means for advancing a previously transferred article from the latch means onto an article which has been advanced to the main elevator by said feeding means.

2. In a wrapping machine, a main elevator, an auxiliary elevator adjacent thereto, means for feeding articles onto said elevators, latch means disposed above said auxiliary elevator, means for reciprocating said elevators in such timed relation that a plurality of articles are transferred to the latch means by the auxiliary elevator as the main elevator is operating, and means for advancing a stack of transferred articles from the latch means onto an article which has been advanced to the main elevator by said feeding means.

3. In a wrapping machine, a main elevator, an auxiliary elevator adjacent thereto, conveyor means aligned with said elevators for advancing a line of abutting articles thereon, stop means engaged by the leading article of said line and positioning an article on each of said elevators, latch means disposed above said auxiliary elevator, means for reciprocating said elevators in such timed relation that an article is transferred to the latch means by the auxiliary elevator as the main elevator is operating and means for advancing a previously transferred article from the latch means onto an article which has been advanced to the main elevator by said conveyor means.

4. In a wrapping machine, a main elevator, a horizontally disposed folding channel to which articles are raised by said main elevator, an auxiliary elevator adjacent said main elevator, belt conveyor means for advancing a line of abutting articles onto said elevators, said main elevator, said auxiliary elevator, and said belt conveyor means being aligned with each other and parallel with said folding channel, stop means engaged by the leading article of said line and positioning an article on each of said elevators, latch means disposed above said auxiliary elevator, means for reciprocating said elevators in such timed relation that an article is transferred to the latch means by the auxiliary elevator as the main elevator is operating and means for advancing a previously transferred article from the latch means onto an article which has been advanced to the main elevator by said conveyor means, said main elevator having a depending skirt on the infeed side thereof for positioning an article on said auxiliary elevator, and said auxiliary elevator also having a depending skirt on the infeed side thereof for preventing advance of articles by said conveyor means when said auxiliary elevator is in a raised position.

5. In a wrapping machine, a main elevator, a horizontally disposed folding channel to which articles are raised by said main elevator, an auxiliary elevator adjacent said main elevator, belt conveyor means for advancing a line of abutting articles onto said elevators, said main elevator, said auxiliary elevator and said belt conveyor means being aligned with each other and disposed transversely of said folding channel, stop means engaged by the leading article of said line and positioning an article on each of said elevators, latch means disposed above said auxiliary elevator, means for reciprocating said elevators in such timed relation that an article is transferred to the latch means by the auxiliary elevator as the main elevator is operating and means for advancing a previously transferred article from the latch means onto an article which has been advanced to the main elevator by said conveyor means, said main elevator having a depending skirt on the infeed side thereof for positioning an article on said auxiliary elevator, and said auxiliary elevator also having a depending skirt on the infeed side thereof for preventing advance of articles by said conveyor means when said auxiliary elevator is in a raised position.

6. In a wrapping machine, a main elevator, an auxiliary elevator adjacent thereto, belt conveyor means aligned with said elevators for advancing a line of abutting articles thereto, stop means engaged by the leading article of said line and positioning an article on each of said elevators, latch means disposed above said auxiliary elevator, means for reciprocating said elevators in such timed relation that an article is transferred to the latch means by the auxiliary elevator as the main elevator is operating and means for advancing a previously transferred article from the latch means onto an article which has been advanced to the main elevator by said conveyor means, said main elevator having a depending skirt on the infeed side thereof for positioning an article on said auxiliary elevator, and said auxiliary elevator also having a depending skirt on the infeed side thereof for preventing advance of articles by said conveyor means when said auxiliary elevator is in a raised position.

7. In a wrapping machine, a main elevator, an auxiliary elevator adjacent thereto, conveyor means aligned with said elevators for advancing a line of abutting articles thereon, stop means engaged by the leading article of said line and positioning an article on each of said elevators, a latch means disposed above said auxiliary elevator and comprising a pair of latches having horizontal portions for supporting an article transferred thereto by said auxiliary elevator and vertical portions for laterally positioning said article, said latch means being pivotally mounted for swinging movement of the horizontal portions upwardly and outwardly of an article, as it is raised by said auxiliary elevator, and then return movement beneath said article to retain the article in an elevated position as the auxiliary elevator is lowered, means for reciprocating said elevators in such timed relation that an article is transferred to the latch means by the auxiliary elevator as the main elevator is operating and means for advancing the previously transferred article from the latch means onto an article which has been advanced to the main elevator by said conveyor means.

8. In a wrapping machine, a main elevator, an auxiliary elevator adjacent thereto, conveyor means aligned with said elevators for advancing a line of abutting articles thereon, stop means engaged by the leading article of said line and positioning an article on each of said elevators, latch means disposed above said auxiliary elevator, means for reciprocating said auxiliary elevator to transfer an article to said latch means, means for supporting an article above said main elevator, means for advancing an article from said latch means to said support means and means for reciprocating said main elevator so that the article on said support means will be raised therefrom in stacked relation on an article previously advanced to said main elevator by said conveyor means.

9. In a wrapping machine, a main elevator, an auxiliary elevator adjacent thereto, conveyor means aligned with said elevator for advancing a line of abutting articles thereon, stop means engaged by the leading article of said line and positioning an article on each of said elevators, latch means disposed above said auxiliary elevator, means for reciprocating the auxiliary elevator a plurality of times to transfer a stack of articles to said latch means, means for supporting a stack of articles above said main elevator, means for advancing a stack of articles from latch means to said support means and means for reciprocating said main elevator so that the stack of articles on said support means will be raised therefrom in stacked relation on an article previously advanced to said main elevator by said conveyor means, the timed relation of the means for reciprocating said elevators being such that a stack of articles is being assembled on said latch means as the main elevator is reciprocating and the stack of articles on said latch means is advanced to said support means as an article is advanced onto the main elevator by said conveyor means.

10. In a wrapping machine, a main elevator, an auxiliary elevator adjacent thereto, conveyor means aligned with said elevators for advancing a line of articles thereon, stop means engaged by the leading article of said line and positioning an article on each of said elevators, latch means disposed above said auxiliary elevator and comprising a pair of latches having horizontal portions for supporting an article transferred thereto by said auxiliary elevator, and vertical portions for laterally positioning said article, said latch means being pivotally mounted so that the horizontal portions will be swung upwardly and outwardly of the article as it is raised by said auxiliary elevator and then dropped beneath said article in an elevated position as the auxiliary elevator is lowered, the vertical and horizontal portions of said latch means extending towards said main elevator and providing means for supporting an article thereabove, means for reciprocating said auxiliary elevator to transfer an article to said latch means, means for advancing the article thus transferred to a position above said main elevator so that the article is supported in an upright position thereabove, and means for reciprocating said main elevator so that the article on the horizontal extensions of said latches will be raised therefrom in stacked relation on an article previously advanced to said main elevator by said conveyor means.

11. In combination with a wrapping machine having an elevator for advancing articles through a wrapper forming well, a stacking device comprising means for advancing a line of articles, a stacking elevator for lifting successive articles from said line, latch means receiving the article lifted by the stacking elevator and means for transferring the lifted article and another article from said line of articles to the elevator of the wrapping machine in stacked relation.

References Cited by the Examiner
UNITED STATES PATENTS

| | | | |
|---|---|---|---|
| 2,717,086 | 9/1955 | Bush | 214—11 |
| 2,924,051 | 2/1960 | More | 214—6.2 X |
| 2,978,125 | 4/1961 | Freeman | 214—6.2 X |
| 3,038,615 | 6/1962 | Roth | 214—6.2 X |
| 3,039,624 | 6/1962 | Campbell | 214—6.2 |
| 3,053,402 | 9/1962 | Russell | 214—6.2 |
| 3,054,515 | 9/1962 | Nawman | 214—6.2 |

GERALD M. FORLENZA, *Primary Examiner.*

HUGO O. SCHULZ, *Examiner.*